United States Patent Office.

EDWARD L. MOLINEUX, OF NEW YORK, N. Y.

Letters Patent No. 76,935, dated April 21, 1868.

IMPROVED METHOD OF PREPARING LAUNDRY-BLUEING.

*The Schedule referred to in these Letters Patent and making part of the same.*

TO ALL WHOM IT MAY CONCERN:

Be it known that I, EDWARD L. MOLINEUX, of the city, county, and State of New York, have invented a new and improved Method of Preparing Laundry-Blueing; and I do hereby declare that the following is a full, clear, and exact description thereof, which will enable others skilled in the art to make and use the same.

The object of this invention is to so prepare the soluble blueing used in laundries, in washing and preparing linen and other similar goods or articles of dress, that it may be offered to the consumer at a reduced price, and in a convenient and portable form; and it consists in combining it with any soluble glutinous or saccharine substance, as starch, sugar, &c., and thereby diluting it and rendering it more serviceable, and better adapted to use, than when in a more concentrated state, and then forming it into sticks or fingers, of sufficient strength and tenacity for transportation and use, such substance or substances being so adhesive, and of such a nature and consistency, that they shall readily dissolve in water, and by so dissolving shall color, but not injure, either the water or the cloth or fabric washed or immersed therein; or I form the blueing into sticks or fingers by pressure alone, or by running into moulds, without combining it with any other substance.

The sticks or fingers thus formed, in combination with any soluble glutinous saccharine or adhesive substance or substances, or by pressure, or by moulds, may be enclosed in wrappers, either of paper or of any fibrous or porous material, and they are used in preparing water for laundry-purposes, or for other purposes where soluble blueing is used in water, by simply immersing the end of the stick in the water, when the blueing, and any substance or substances of the nature and consistency named, with which it may be combined, will readily dissolve.

In combining the blueing with the soluble substances referred to, (such as starch, sugar, or substances of a similar nature,) the blueing is better fitted for use than it is as ordinarily prepared in a more concentrated state.

By this method of preparing the "blueing," all expense of putting it up in bags or boxes is avoided, it is in the most convenient form for transportation and use, while the expense of the article is materially lessened to the consumer.

I do not confine myself to any particular shape or size for such sticks or fingers of blueing, nor to any glutinous or other soluble substance to combine with the blueing for forming the sticks, nor to any kind of wrapper, my object being to furnish the blueing in the most cheap, portable, and convenient form for sale and use.

A sample of the blueing thus prepared is herewith forwarded.

Having thus described my invention, what I claim as new, and desire to secure by Letters Patent, is—

1. Forming the article called laundry-blueing into sticks or fingers, and thus preparing it for sale and use, substantially as described.

2. I claim combining laundry-blueing with starch, sugar, or other soluble glutinous or saccharine substance, thereby diluting it and improving it for use, whether the same be formed into sticks or fingers or not.

EDWARD L. MOLINEUX.

Witnesses:
CHARLES LILLIE,
WM. H. CRONK, Jr.